United States Patent Office 3,310,369
Patented Mar. 21, 1967

3,310,369
PROCESS FOR PRODUCING ANHYDROUS AMMONIUM BIFLUORIDE FROM AN AQUEOUS SOLUTION OF AMMONIUM FLUORIDE
John A. Peterson, Niagara Falls, N.Y., assignor to Hooker Chemical Corporation, Niagara Falls, N.Y., a corporation of New York
No Drawing. Filed May 27, 1964, Ser. No. 370,703
3 Claims. (Cl. 23—88)

This invention relates to an improved method of manufacturing ammonium bifluoride. More particularly, this invention relates to the dehydration of aqueous solutions of ammonium fluoride and the subsequent thermal conversion of ammonium fluoride to ammonium bifluoride in improved yields of product of improved low water content, with a minimal loss of fluorine values.

Ammonium bifluoride is a useful commercial product normally considered to be more desirable than ammonium fluoride for many uses. It is chemically more reactive, readily yields hydrogen fluoride on reaction with strong acids, e.g., hydrochloric acid, sulfuric acid and so forth, etches glass, extractively attacks minerals and undergoes other useful chemical reactions. For these reasons, and others, ammonium fluoride is preferably converted to ammonium bifluoride.

The conversion of ammonium fluoride to ammonium bifluoride may be effected by heating to a temperature sufficient to volatilize some of the ammonia. This a known process. The thermal conversion of ammonium fluoride to ammonium bifluoride occurs according to the reaction:

$$2NH_4F \xrightarrow{heat} NH_4HF_2 + NH_3\uparrow$$

Ammonium bifluoride can be prepared by at least two methods. The normal commercial method is the reaction of a proper ratio of hydrogen fluoride with ammonia e.g., $NH_3 + 2HF \rightarrow NH_4HF_2$. Another method that may be used is the dehydration of aqueous ammonium fluoride coupled with a thermal conversion of ammonium fluoride to ammonium bifluoride.

Although the thermal conversion of ammonium fluoride to ammonium bifluoride appears to be a relatively simple procedure, numerous difficulties have been encountered. Since the thermal conversion to ammonium bifluoride often commences with an aqueous ammonium fluoride, the ammonium fluoride is first dehydrated to obtain an anhydrous product. Dehydration of ammonium fluoride to less than 1 percent water is particularly difficult because the final 5 to 6 percent water is tenaciously held by the ammonium fluoride. To free this water, the ammonium fluoride was heated to temperatures in the range of 130 to 170 degrees centigrade. At these temperatures, conversion to ammonium bifluoride also takes place. In addition, such temperatures cause volatilization of an excessive amount of fluorine values, thus limiting the yield and percent conversion to ammonium bifluoride. For these reasons, previously a lower percent conversion of less than about 80 percent ammonium fluoride to ammonium bifluoride was accepted, as well as a higher percent water retention amounting to more than about 2 or 3 percent and a fluorine loss ranging from about 8 to 9 percent and more. In order to further dehydrate, a higher fluorine loss had to be accepted. Likewise, to obtain a higher percent conversion of ammonium fluoride to ammonium bifluoride a greater loss of fluorine was to be expected. It may have actually been impossible to achieve an enrichment of fluorine in the product sufficient to reach the $NH_4HF_2$ composition. The rate of fluorine loss tended to become high with respect to the ammonia loss rate so that the product composition showed a constant ammonia excess as would be indicative of an $$NH_4HF_2—NH_4F$$

mixture. The inability to obtain high conversion to ammonium bifluoride has been a factor in limiting the commercial development of this method.

It is an object of this invention to provide a method of obtaining an improved conversion of ammonium fluoride to ammonium bifluoride, while achieving a lower water content and lower percent loss of fluorine values. Another object is to provide a method of converting aqueous ammonium fluoride to ammonium bifluoride having less than 1 percent water. A further object is to provide an improved method of reducing fluorine value loss during the dehydration and thermal conversion of aqueous ammonium fluide to ammonium bifluoride. These and other objects will become apparent to those skilled in the art from the description of the invention.

The objects of this invention are accomplished by a process comprising dehydrating ammonium fluoride at a temperature of 130 degrees centigrade to 230 degrees centigrade, passing the gases evolved through a reaction zone maintained at a temperature of 100 degrees centigrade to 140 degrees centigrade, reacting in said reaction zone, volatilized hydrogen fluoride and ammonia obtained during the dehydration of the ammonium fluoride to form ammonium bifluoride, exhausting from said reaction zone water and excess ammonia, returning the ammonium bifluoride produced in the reaction zone to the ammonium fluoride being dehydrated, continuing the process until substantial removal of water from the ammonium fluoride starting material has been effected and recovering the ammonium bifluoride produced.

This invention provides a method of obtaining a considerably improved conversion of ammonium fluoride to ammonium bifluoride by a thermal decomposition and reaction process. Products having a water content of less than 1 percent are readily obtained without appreciable loss of fluorine values. The process of this invention provides a degree of flexibility in processing technique producing equally good results over a wide pressure range.

The process of this invention commences by feeding ammonium fluoride, obtained from any convenient source or process, into a thermal decomposer unit. A thermal decomposer is a vessel having outlets and capable of heating aqueous solutions to elevated temperatures. The ammonium fluoride feed used is normally an aqueous solution of concentrations varying between about 1 percent and 95 percent ammonium fluoride by weight. Aqueous ammonium fluoride solutions having concentrations in the range of 15 percent to about 45 percent by weight are most frequently used.

Aqueous solutions of ammonium fluoride are obtained from various scrubbing processes in the defluorination of industrial waste gases. Certain industrial processes such as the acidulation and calcination of phosphate rock, fluorapatite or fluorspar, and certain aluminum production methods, such as the electrolysis of cryolite or fluellite, evolve waste gases containing fluoride values. Since these gases are highly corrosive, toxic, and odoriferous, it is desirable not to vent them to the atmosphere without reducing their harmful effects.

One means of removing the fluorine values and thus decontaminating the waste gases, is to scrub the gases with water. Since fluorine gases are very soluble in water, they are readily absorbed in aqueous scrubbing liquors. In the removal of fluoride values from a gas stream, considerable expense is incurred in both scrubbing the waste gases as well as disposing of the scrubbing liquor. Therefore, it is desirable to recover the fluorine values as useful products. Ammoniation of such scrubbing liquors provides a purification step by causing precipitation of silica, while forming a solution of the very soluble ammonium fluoride salt. This separation of silica and fluoride is especially useful when waste gases contain substantial amounts of silicon tetrafluoride, as is often the case. Silicon tetrafluoride is also absorbed in the scrubbing liquor, forming fluosilicates. The ammoniation converts the fluosilicates to soluble ammonium fluoride and insoluble silica, which are separable.

The process of this invention is effected by dehydrating and decomposing ammonium fluoride and subsequently reacting the decomposition products at a temperature at which water does not recombine with the reaction products. This procedure is accomplished by heating aqueous ammonium fluoride to a temperature of 130 degrees centigrade to 230 degrees centigrade in a closed decomposition vessel having agitating means and venting means for the volatilized gases. In heating to these elevated temperatures, water, ammonia and fluorine values are volatilized. These volatilized components are conducted to a reactor maintained at a temperature of 100 degrees centigrade to 140 degrees centigrade, wherein ammonia and fluorine values react and are condensed, while water and excess ammonia pass through the reactor as gases. The reaction mechanism is not completely understood but it is believed to be according to the equations:

(1)
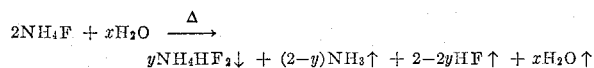

(2)
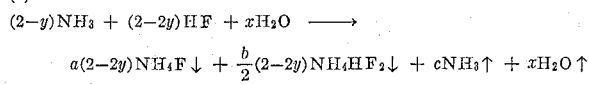

where Equation 1 represents the reaction taking place in the decomposer and Equation 2 represents the reaction effected in the reactor, and where $y$ varies from 0 to 1, $a+b$ is equal to 1 and $c$ is equal to $$(2-y)-(a+b/2)(2-2y)$$

When the conversion of all $NH_4F$ to $NH_4HF_2$ occurs, $y$ equals 1. At a 90 percent conversion, effected at about 165 degrees centigrade, $y$ is equal to 0.9, whereas at a temperature of about 200 degrees centigrade $y$ is equal to 0.5. In Equation 2 where $a+b$ equals 1, fraction $a$ of HF gas goes to form $NH_4F_2$ and fraction $b$ of HF gas goes to form $NH_4HF_2$. If the gas phase is rich in $NH_3$ and low in HF, $a$ is greater than $b$. This occurs in the initial phase of the reaction. $a$ becomes less than $b$ as the reaction temperature increases and the formation of $NH_4HF_2$ is favored. It is believed that in most instances $a$ is less than $b$ since $NH_4HF_2$ formation is favored.

While the reaction is normally run at atmospheric pressure, superatmospheric and subatmospheric pressures can be used. Reduced pressures as low as about 30 millimeters of mercury may be used to facilitate volatilization. However, poor results are obtained if a greatly reduced pressure is applied prior to reduction of the water content below about 15 percent. The results are poor in that water is volatilized but decomposition and volatilization of ammonia is suppressed, leading to anhydrous $NH_4F$ rather than $NH_4HF_2$. When reduced pressures are used, the operating temperature is preferably that sufficient to effect decomposition and volatilization of ammonium fluoride, e.g., above about 130 degrees centigrade.

The reaction time of the present process varies with the temperature used in the decomposer. Normally, the reaction time varies from about ½ hour to several hours the time being that required to reduce the water content to less than 1 percent.

The end product contains less than one percent water, is more than 90 percent ammonium bifluoride and hydrogen fluoride losses are less 5 percent of input fluorine by weight.

The temperature in the reaction zone or reactor, where Equation 2 takes place, is controlled to be between 100 degrees centigrade and 140 degrees centigrade. The lower temperature, that is 100 degrees centigrade, is below the melting point of ammonium bifluoride. It is preferred to maintain a temperature at which the ammonium bifluoride or fluoride enriched mixture is liquid so as to aid in the removal of accumulating ammonium fluoride melt from the reactor. Temperatures exceeding about 140 degrees centigrade are not as efficient in retaining gaseous hydrogen fluoride and effecting a reaction with ammonia and tend to cause a reversal of the reaction. Therefore, temperatures exceeding 140 degrees centigrade are not preferred. Temperatures in the range of 115 degrees centigrade to 130 degrees centigrade are preferred. If the reactor is below the melting point of the ammonia-fluorine enriched mixture, means for removing solidified product from the reactor walls may be necessary for continuous operation. Means, such as scrapers, contacting the reactor walls are effective in removing solidified ammonia-fluorine enriched product.

The ammonia-fluorine enriched product recovered from the reactor will vary from nearly pure anhydrous ammonium bifluoride to an ammonia fluoride-ammonium bifluoride mixture containing a very small proportion of water. This product varies in melting point from about 109 degrees centigrade, for a mixture, to 126.1 degrees centigrade for pure ammonium bifluoride. By maintaining a reactor temperature above the melting point of the composition, e.g., at 115 degrees centigrade to 130 degrees centigrade, a more anhydrous product is condensed in the molten state.

The reactor is of sufficient capacity and surface area so as to permit reaction between fluoride values and ammonia values volatilized in the decomposition step. The sufficiency of the reactor for a given decomposition unit is readily determined. The reactor should have sufficient heat transfer capacity so as to control the volatilized gases within the preferred temperature range. A reactor which is capable of controlling the temperature so as to exhaust gases therefrom at a temperature of 100 degrees centigrade to 140 degrees centigrade and more preferably 115 degrees centigrade to 130 degrees centigrade, is of sufficient capacity.

The reactor and the decomposition unit are preferably constructed of corrosion-resistant materials such as nickel and its alloys. The design of the reactor can be varied within the capacity limits stated. Specially constructed distillation columns of the plate or packed type provide a suitable reactor. Other apparatuses having high heat transfer efficiency or area and capable of maintaining temperatures within the preferred range are also suitable.

The reactor is operated at atmospheric, superatmospheric or reduced pressures as low as about 30 millimeters of mercury. Normally, the reactor operates at pressures similar to those of the decomposer. When operating in the more preferred temperature range of 115 degrees centigrade to 130 degrees centigrade, ammonium bifluoride is condensed in liquid form and removed by gravity as an ammonium fluoride enriched product. Alternatively, the ammonium fluoride enriched product is returned to the decomposition unit. Unreacted ammonia and water pass through the reactor and may subsequently be condensed for re-use. The ammonia-water condensate is particularly valuable for recycle in a scrubbing operation as previously described.

This invention is operated either as a continuous process or as a batch operation. Continuous operation is effected by continuous additions of ammonium fluoride solution to the decomposer unit and continuous removal of anhydrous ammonium bifluoride. This process is also preferably used as an integrated part of a fluorine recovery process.

Fluorine recovery processes involving the scrubbing of waste flue gases containing about 1 percent up to 70 percent fluorine values are typical of the type processes in which the present invention may be incorporated. The ammoniated scrubber liquor is filtered and the filtrate passed to the dehydration unit where ammonium bifluoride is formed by the process of this invention. Ammonium bifluoride so formed may be further treated by known processes to recover anhydrous hydrogen fluoride or may be used commercially as anhydrous ammonium bifluoride. The volatilized ammonio and water passing through the reactor are recycled to the scrubbing units for further absorption of fluorine values.

The invention will be understood with reference to the following examples which are illustrations of certain preferred embodiments of the present invention. Unless otherwise indicated, all temperatures are in degrees centigrade and all parts and percentages used in the specification and claims are by weight.

*Example 1*

This example illustrates the process of this invention and the greatly improved product obtained thereby.

Dehydration, decomposition and thermal conversion of a 30 percent aqueous ammonium fluoride solution was accomplished by heating the ammonium fluoride solution in a decomposer vessel suitable for operation at reduced pressure and having stirring means, thermometer, vacuum means and means for conveying gases to a reactor maintained at a temperature of 128 degrees centigrade ±2 degrees centigrade. The reactor was a packed, heat transfer vessel constructed of nickel. The packings were of nickel wire. The reactor temperature was regulated by a liquid temperature control jacket surrounding the packed column capable of heating and cooling.

The aqueous solution was heated at atmospheric pressure to a temperature of 150 degrees centigrade. The pressure within the unit was then reduced to 180 millimeters of mercury and heating was continued to a temperature of 160 degrees centigrade. While maintaining the temperature at 160 degrees centigrade in the dehydration vessel, volatilized ammonia, hydrogen fluoride and water were conveyed to the reactor where fluoride enriched ammonium fluoride was condensed. The fluoride enriched ammonium fluoride condensed was returned directly to the dehydration vessel. Alternately, this fluoride enriched product could be removed as end product but normally it has not been completely converted to the bifluoride.

After maintaining the temperature at 165 degrees centigrade for 1½ hours, heating was discontinued. The product obtained from the dehydration vessel by this process has a water content of less than 0.2 percent and an ammonium fluoride conversion to ammonium bifluoride of 95 percent. The fluorine loss was less than 4 percent.

*Example 2*

The procedure of Example 1 was repeated with the exception that reduced pressure was not used. A 15 percent aqueous solution of ammonium fluoride was heated to a maximum temperature of 185 degrees centigrade. The vapors evolved were passed through the reactor described in Example 1 maintained at a temperature of 120 degrees centigrade ±2 degrees centigrade. The temperature in the decomposer unit was maintained at 185 degrees centigrade for one hour. Ammonium fluoride enriched product condensing in the reactor was returned to the dehydration unit. Product returning to the decomposer was sampled and found to contain a high percent ammonium bifluoride content and about 0.1 percent water. After one hour the product in the dehydration unit contained 0.1 percent water and was 93 percent by weight ammonium bifluoride corresponding to a 95 percent conversion of the ammonium fluoride input. The fluorine loss was less than 4 percent.

While there have been described various embodiments of the invention, the methods and elements described are not intended to be understood as limiting the scope of the invention, as it is realized that changes therewithin are possible. It is intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for producing anhydrous ammonium bifluoride which comprises heating an aqueous solution of ammonium fluoride in a dehydration zone at a temperature of from about 150 to 230° centigrade and a pressure from atmospheric to thirty millimeters of mercury, evolving gaseous water vapor, ammonia and hydrogen fluoride from said ammonium fluoride solution by said heating, removing the thus-evolved gases from contact with the ammonium fluoride solution in the dehydration zone, passing the thus-removed gases into a reaction zone, reacting the said gases in the reaction zone at a temperature from about 100 to 140° centigrade to form a fluoride-enriched ammonium bifluoride, condensing the thus-formed fluoride-enriched ammonium bifluoride, separating the thus-condensed fluoride-enriched ammonium bifluoride from unreacted ammonia and water vapor in said reaction zone, passing the unreacted ammonia and water vapor through said reaction zone, recycling the separated, condensed fluoride enriched ammonium bifluoride to the ammonium fluoride solution in the dehydration zone, repeating the process until substantially all the water has been removed from the ammonium fluoride starting material and recovering an ammonium bifluoride product containing less than about 1% moisture.

2. The method as claimed in claim 1 wherein the ammonium fluoride solution in the dehydration zone is heated at a temperature from about 150 to 190° centigrade.

3. The method as claimed in claim 1 wherein the gases evolved in heating the ammonium fluoride solution in the dehydration zone are reacted in the reaction zone at a temperature of from about 115 to 130 degrees centigrade.

UNITED STATES PATENTS

References Cited by the Examiner

| | | | |
|---|---|---|---|
| 2,156,273 | 5/1939 | Bozarth | 23—88 |
| 2,446,484 | 8/1948 | McClenahan | 23—88 |
| 2,816,818 | 12/1957 | Gross | 23—88 |
| 3,005,684 | 10/1961 | Riedl et al. | 23—88 |
| 3,089,752 | 5/1963 | Clark | 23—88 |
| 3,106,449 | 10/1963 | Fitch | 23—88 |
| 3,195,979 | 7/1965 | Burkert et al. | 23—88 X |
| 3,212,849 | 10/1965 | Kauders et al. | 23—88 |

OTHER REFERENCES

AEC—tr—3927 (Part 2), "The Chemistry of Fluorine and Its Inorganic Compounds," by I. G. Ryss, Moscow, 1956, pages 820 and 821. United States Atomic Energy Commission, Technical Information Service.

OSCAR R. VERTIZ, *Primary Examiner.*

EDWARD STERN, *Examiner.*